Patented Aug. 27, 1935

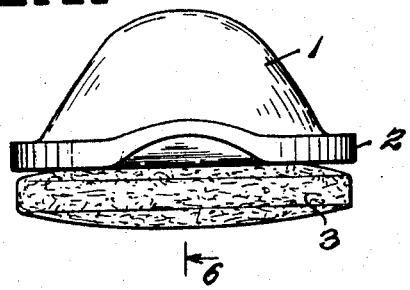
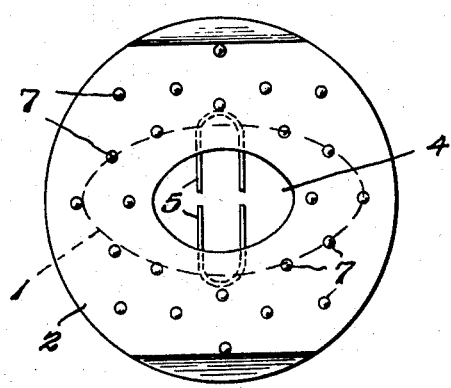
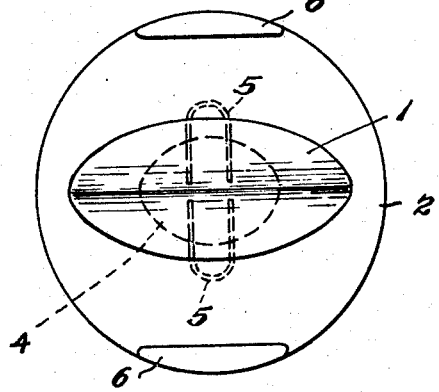
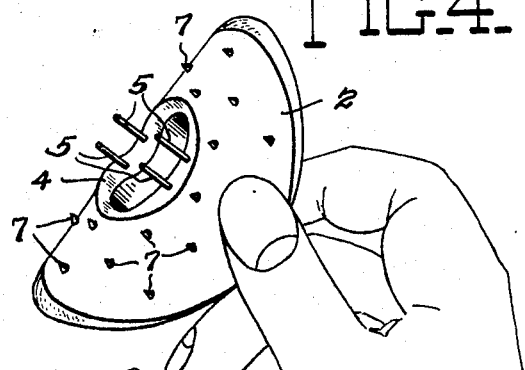
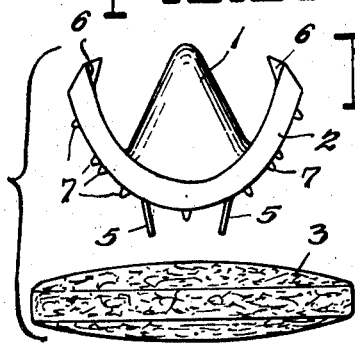
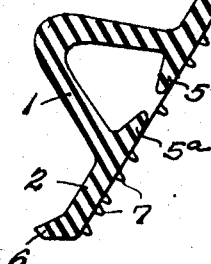
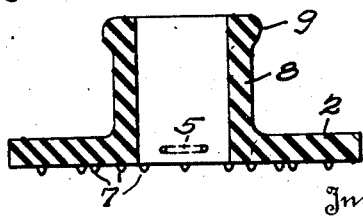
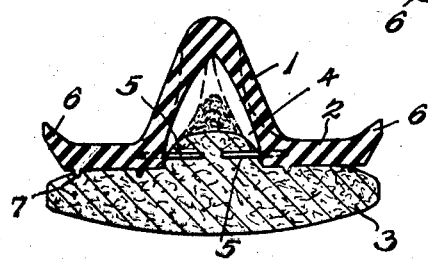

2,012,500

UNITED STATES PATENT OFFICE 2,012,500

MANIPULATOR FOR SCOURING PADS

Lyda G. Ebert, Lakewood, Ohio, and Minnie K. Grable, Pittsburgh, Pa.

Application April 9, 1934, Serial No. 719,774

1 Claim. (Cl. 15—209)

The present invention appertains to scouring or cleaning pads of the kind now very commonly in use for scouring and cleaning pans, cooking vessels, and the like. At the present time these pads are perhaps most universally made from steel or metal wool, and the handling of the pad has disadvantages because of the possibility of particles of the metal wool penetrating the fingers which grasp the pad in the operation of scouring pans or the like.

Having the foregoing in view, this invention comprises a manipulator for the pad and while it is especially adapted for application to scouring pads of fibrous metal substance, it is equally useful in connection with any other kind of pad such as might be made of different material, since the use of the manipulator avoids the necessity of directly grasping the substance or pad member which is to do the scouring work.

The manipulator of this invention is peculiarly designed not only with the object in view of protection of the hand and fingers as the pad is being manipulated or rubbed or abrasively applied to the article being cleaned, but the construction of the manipulator is such as to facilitate the application of the same to the pad in a manner to interlock with the latter so that the pad will not be displaced from the manipulator as the latter is being handled in a scouring or cleaning operation. With the last feature of the invention as above mentioned in mind, the manipulator is preferably designed so as to comprise a rubber body made up of three principal features, namely a handle, a pressure or bearing member to receive the scouring pad, and penetrating means carried by the pressure or bearing member to interengage with the pad and prevent the displacement of the latter from the manipulator in the practical use of the pad for its particular purposes. The penetrating means employed may comprise penetrating pins or prongs of metal sunk in the body of the manipulator, said body forming the pressure or bearing member being made of rubber preferably so that it will flex in a peculiar way to be more fully presented hereinafter in the action of interengaging the penetrating prongs or parts with the body of the scouring pad. However, the penetrating prongs may be made of rubber elements integral with the rubber or similar body of the manipulator itself, all as will be more fully understood upon reference to the following description in conjunction with the drawing annexed hereto, in the latter of which—

Figure 1 is a side view of a scouring pad and manipulator embodying the invention properly applied to said pad.

Figure 2 is a top plan view of the manipulator, dotted lines showing the metal penetrating prongs.

Figure 3 is a bottom plan view of the manipulator alone.

Figure 4 is a perspective view illustrating how the pressure or bearing member of the manipulator is adapted to be bent upon itself to initially spread the penetrating prongs for engagement with the scouring pad in the act of accomplishing the said engagement.

Figure 5 is a side view showing the manipulator bent into the form illustrated in Figure 4 and disposed above the scouring pad ready to be engaged therewith.

Figure 6 is a view similar to Figure 5 taken on the line 6—6 of Figure 1, but showing the parts in section and illustrating the arrangement of the manipulator and pad after the two have been interengaged, dotted lines illustrating how the handle may be compressed because of its hollow nature so as to more firmly enable the gripping of the material or substance from which the scouring pad is made.

Figure 7 is a sectional view of a modified form of manipulator.

Figure 8 is a sectional view of another modified embodiment of the invention.

The manipulator hereinafter set forth is preferably a rubber article, though it might be made of a rubber composition, or other composition that will permit of resiliency of the body and handle parts, especially the body part which forms the pressure or bearing member.

As seen in the drawing, the manipulator is comprised of a handle 1 and the pressure or bearing member 2, the latter consisting of a somewhat round flat body part and the handle projecting upwardly from its upper side and adapted to be readily grasped for the purpose of rapidly moving the scouring pad 3 attached to the body or member 2. The handle 1 really forms a hollow extension of the pressure member 2 and is integrally molded with the latter in the preferred manner of manufacture of the article. In other words, in its lower side the pressure member 2 is formed with an opening 4 which is molded therein during the making of the article and which opening merges upwardly into a space within the handle 1, thus affording the hollow formation of the latter. At opposite sides of the opening 4 as seen best in Figure 3, there are embedded in the pressure member or body 2 a plurality of penetrating prongs 5 which may be disposed in opposite pairs and constitute the projecting legs of U-shaped metal parts as readily seen in the drawing. By being molded in the rubber or other body of the pressure member 2, the penetrating parts 5 are firmly anchored in place and cannot be displaced or removed for obvious reasons.

The scouring pad 3 illustrated is a conventional type of round pad which is commonly on the market today but this pad 3 may be made of any kind of scouring material or it may be made from a small quantity of metal wool such as steel fibers which are sort of molded into a pad formation. The particular form or nature of the pad 3 is not material to the invention other than that this pad shall be of a suitable scouring or cleaning nature and it is quite possible that under some conditions material other than metal fibers or the like may be employed and usefully combined with the manipulator of the invention.

In the practical use of the invention according to the forms thereof in Figures 1 to 6 inclusive, it is contemplated that opposite edge portions of the pressure member or body 2 shall be formed with finger pieces 6 which are virtually flats of small area adapted to provide bearings for the fingers, facilitating the grasping of the pressure member 2 for bending it in the manner shown in Figure 4 to spread the penetrating prongs 5 apart preliminary to the interengagement of the said prongs with the pad 3. The finger pieces or flats 6 really perform another function in that they afford indicators to advise the person using the manipulator just where to grasp the part 2 in order to bend the same properly to spread the members 5 into the position shown in Figures 4 and 5. When the article is bent as shown in Figures 4 and 5, the prongs 5 will project at nearly a right angle from the part 2 so as to permit these prongs to be shoved downwardly into the pad 3, see Figure 5, and then upon release of the edge portions of the pressure member 2 the manipulator will assume the position of Figure 6 properly interengaged with the pad 3 and ready for use in a scouring operation.

As a means for establishing an additional grip or friction between the manipulator of the invention and the scouring pad, it is contemplated to provide the under-surface of the pressure or bearing member 2 with a plurality of projections 7 which will preferably be molded on the rubber body and will have a tendency to interengage with the body material of the scouring pad in a manner which will be obvious for the purpose in view. The handle portion 8 of the manipulator structure as disclosed in Figure 7 forms a compressible receptacle-like handle structure.

In Figure 8 there is disclosed a slight modification of the invention wherein the penetrating prongs 5a are integrally formed with the member 2 instead of being made up of separate metal parts as previously described and shown in the other figures of the drawing.

It will be evident from the foregoing that the manipulator of this invention may be quickly engaged and fastened to a scouring pad, and will effectively hold the pad in position as it is to be manipulated back and forth on the bottom and in the corner portions of pans or other vessels and when the pad has been worn out it may be very easily removed from the manipulator and a fresh pad replaced. Moreover, by reason of the hollow formation of the handle 1, the handle may be squeezed or its sides pressed together as it is grasped in the manipulating operation, and under such conditions the portion of the scouring pad which is received in the hollow portion of the handle may be gripped to a certain extent to increase the holding effect of the manipulator relatively to said pad. This feature of the invention has been illustrated in dotted lines in Figure 6.

As regards the opening 4 in the bottom of the pressure member 2, it is notable that said opening is preferably elongated so as to facilitate spreading apart of the sides thereof carrying the prongs 5 in the operation of removing the article from a mold when the article is made from rubber or rubber compounds.

In Figure 7 there is shown a modification comprising a somewhat different handle construction 8; in all other respects the construction of Figure 7 is the same as that disclosed in Figures 1 to 6. The section of this figure is taken in a right angle to the section of Figure 6 and the finger pieces 6 are therefore not seen in this figure. The upper portion of the handle 8 is provided with a rim portion 9 which permits a more secure gripping of the handle which may be also squeezed as it is grasped for manipulating operation in a like manner to the handle shown in Figure 6, in dotted lines.

It is to be noted that the penetrating members 5, being made of metal, are advantageously located a considerable distance above the plane of the lower face of the manipulating base 2 which contacts with the scouring pad 3. The foregoing arrangement of the prongs is desirable in order to avoid any liability of these members contacting with and marring the surface of a pan, vessel or other similar part which may be scoured or cleaned by the use of the invention. Especially is this true when the pad itself becomes worn to a relatively thin mass or bulk after continuous use.

Having thus described our invention, what we claim as new and desire to secure by Letters Patent of the United States, is—

A manipulator for scouring pads, comprising a transversely compressible handle portion having a longitudinal opening therethrough extending from end to end, a pressure member of relatively large area formed about the base of said handle portion, said pressure member having oppositely extending pad engaging prongs normally projecting laterally into the handle opening towards each other, and said pressure member being flexible whereby the same may be deformed about the handle portion to present the pad engaging prongs below the base of the handle in the application of a scouring pad to the manipulator by an impaling of the pad on the prongs, said prongs serving to draw a portion of said pad into the lower open end of said handle portion of the manipulator incident to release of said pressure member from the deformed position aforesaid and assumption of the prongs of their normal position, so as to enable the part of the pad so drawn into the handle portion to be further gripped by manual transverse compression of the handle portion of the manipulator, and said compressible handle portion constituting a receptacle-like structure having direct communication with the pad when the pad is attached.

LYDA G. EBERT.
MINNIE K. GRABLE.